Oct. 15, 1929.    V. A. FYNN    1,731,238
METHOD AND MEANS FOR OPERATING ALTERNATING CURRENT MOTORS
Filed Jan. 11, 1928
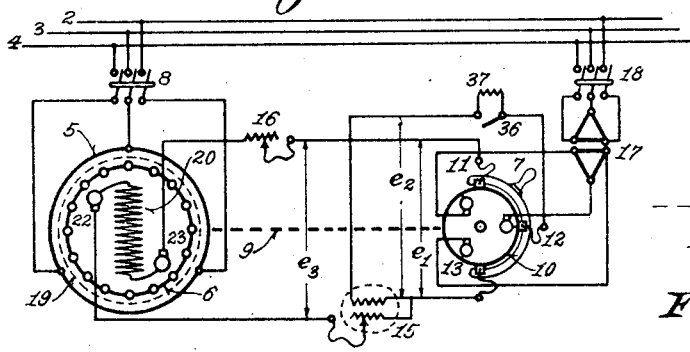
Fig. 1.
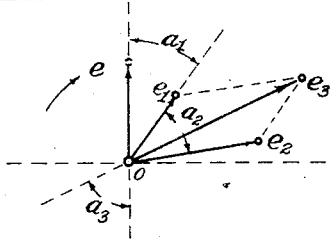
Fig. 6.
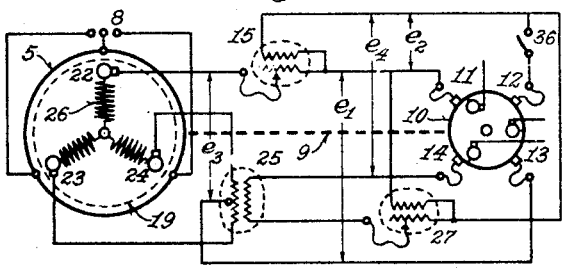
Fig. 4.
Fig. 2.
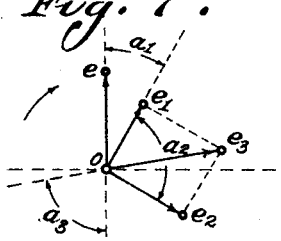
Fig. 7.
Fig. 5.
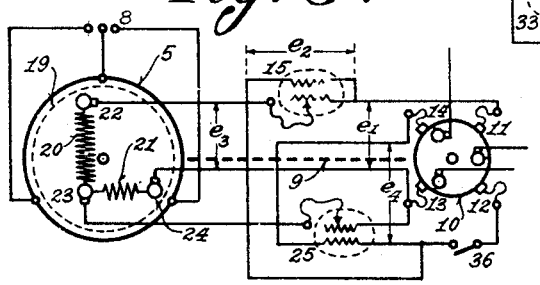
Fig. 3.
Inventor:
Valère A. Fynn Patented Oct. 15, 1929

1,731,238

UNITED STATES PATENT OFFICE

VALÈRE A. FYNN, OF ST. LOUIS, MISSOURI; FRANKLIN-AMERICAN TRUST COMPANY ADMINISTRATOR OF SAID VALÈRE A. FYNN, DECEASED

METHOD AND MEANS FOR OPERATING ALTERNATING-CURRENT MOTORS

Application filed January 11, 1928. Serial No. 245,994.

My invention relates to alternating current dynamo electric machines which can operate at synchronous speed and is directed to improved means for synchronizing such machines or bringing them into step, and to controlling the unidirectional ampereturns on their secondary members in synchronous operation. It is particularly applicable to motors in which a revolving field is produced in one way or another during the synchronizing period and which are synchronized by means of one or more auxiliary voltages of slip frequency.

I have discovered that when a motor is to be synchronized from a speed which is materially below its synchronous speed, in other words from a speed at which its "slips" is considerable, or when one or more of the windings on the secondary of the motor which are to be used for synchronization have a considerable inductance, the phase and magnitude adjustments heretofore used in connection with a synchronizing slip frequency voltage or voltages must be modified to secure the best results.

I have found that the current a slip frequency voltage of constant amplitude is able to send through the secondary winding of an alternating current motor varies considerably with varying secondary frequency, rising first slowly and then more or less rapidly as the secondary frequency diminishes. Thus for a given ratio of inductance to ohmic resistance of a secondary winding the current a slip frequency voltage of given magnitude can send through it at 60 cycles may be 8 amperes, rising to 73 at 5 cycles and to 116 at zero cycles. For a second secondary winding with a ten times greater inductance but with the same resistance as the first corresponding current values might be 2, 12 and 116 amperes. Concurrently, the lag of this current behind the auxiliary voltage to which it is due is much greater in the second case, the difference increasing rapidly, near zero slip, with increasing secondary frequency.

Supposing that an auxiliary voltage, say of sinusoidal wave shape, having an amplitude equal to the maximum value of the unidirectional voltage used in synchronous operation can be adjusted as to phase to satisfactorily synchronize a machine provided with the first mentioned winding from a slip of say five percent, then the same magnitude and phase adjustment of said voltage will certainly not synchronize a machine provided with the second winding from the same slip anything like as well or perhaps not at all. In order to secure the same synchronizing ability in the second case from a five percent slip, it is not only necessary to use an auxiliary voltage of much greater amplitude but to adjust its phase quite differently. In the first case the auxiliary voltage may be cophasal with or differ but little as to phase from the voltage generated by the revolving flux of the motor in the secondary winding upon which said auxiliary slip frequency voltage is impressed for the purpose of synchronization. In the second case a larger phase difference must be brought about between the auxiliary and the generated voltages in order to get anything like as good results.

When dealing with a secondary winding of low inductance powerful synchronization can be had from small slips, i. e., from speeds very near the synchronous, without making the amplitude of the auxiliary voltage at sub-synchronous speeds greater than its amplitude at synchronism and without displacing the phase of the auxiliary voltage from that of the generated voltage by more than a few degrees. The motor can be synchronized with an auxiliary voltage of what may be spoken of as normal magnitude. When the auxiliary voltage is derived for instance from a frequency converter which is also used for providing the excitation of the motor in synchronous operation, the phase of the converter voltage can, under these conditions, always be so set as to secure without readjustment ample synchronizing ability and a desirable exciting-voltage-load characteristic in synchronous operation.

When dealing with secondary winding of high inductance, or when synchronizing a low inductance winding from a considerable slip, or when synchronizing from a considerable slip with the help of a secondary winding of high inductance, powerful synchronization cannot be had unless the magnitude of the auxiliary voltage is considerably in excess of its normal magnitude and unless the phase difference between auxiliary and generated voltage is considerably greater than 45 degrees and usually so great as to preclude a satisfactory exciting-voltage-load characteristic in synchronous operation.

In order to overcome these objections and for the purpose of extending the scope and usefulness of slip frequency synchronization, I have conceived the idea, generally speaking, of impressing on a secondary winding an auxiliary voltage in excess of the maximum required during synchronous operation and differing greatly in phase from the phase of the voltage generated in said secondary winding by the revolving flux produced in the machine, so as to secure the desired synchronizing performance under adverse slip or winding inductance conditions, and then reducing the magnitude of the auxiliary voltage and of the phase difference between it and the generated voltage. I can carry out this method by hand but prefer to do so automatically because of the often rapid synchronizing process. In one way of carrying my invention into practice I provide a source which yields a slip frequency voltage of the amplitude required for synchronous operation and of a phase which insures the desired exciting-voltage-load characteristic at synchronism, add to this normal auxiliary voltage a second slip frequency voltage of different phase and remove this additional voltage or render it inoperative as the machine reaches synchronism. As a modification, I may vary the magnitude, and if desired also the phase, of the additional voltage, decreasing its magnitude with increasing motor speed. In one form of this embodiment I impress the normal auxiliary voltage on the secondary motor winding conductively and inductively introduce the second slip frequency voltage into the circuit of said winding and in series with the normal auxiliary voltage. I may change the magnitude of the second voltage as synchronization progresses but, because of the manner of the introduction, it automatically becomes inoperative in so far as the secondary motor winding is concerned as the motor reaches synchronism. If more than one secondary motor winding is used for synchronization then I impress an auxiliary voltage on each and a second voltage on at least one of said windings, usually on the one having the higher inductance.

All objects and features of this invention will more clearly appear from the detail description taken in connection with the accompanying drawing and will be pointed out in the claims.

Fig. 1 of the accompanying diagrammatic drawing shows my invention as applied to a polyphase motor with one synchronizing circuit on the secondary. Figs. 2 and 3 show the invention as applied to motors having two displaced secondary synchronizing circuits. Figs. 4 and 5 show the invention as applied to motors having three displaced secondary synchronizing circuits and Figs. 6 and 7 are explanatory diagrams.

Referring to Fig. 1, which, like all the other figures, shows two-pole machines, the three-phase synchronous motor carries a primary winding 5 located on the stator and adapted for connection to the supply 2, 3, 4 through switch 8. Its secondary member 19, here the rotor, carries a squirrel cage 6 and a monoaxial so-called exciting winding 20 connected to the sliprings 22, 23. Mounted on the shaft 9 of the motor is a frequency converter comprising a commuted winding 10 connected to three sliprings and to a commutator which is not shown. The winding 10 can be connected to the supply by way of transformer 17 and switch 18. Brushes 11, 12, 13 cooperate with the commuted winding and are insulatingly held in the movable brush rockerarm 7. The brushes 11, 13 are displaced by 180 electrical degrees and 12 is displaced by 90 electrical degrees from each of the others. Brush 11 can be connected to slipring 23 through the adjustable resistance 16. Brush 13 can be connected to slipring 22 through the adjustable secondary of the transformer 15 the primary of which is connected to brush 13 directly and to brush 12 through resistance 37 which can be shortcircuited by switch 36. The mains 2, 3, 4 and the connections thereto from 5 and 10 have, for the sake of simplicity and clearness, been omitted from all figures but the first. These connections can be made as shown in Fig. 1.

In Fig. 2 the rotor 19 of the three-phase motor carries two windings 20 and 21 the axes of which are displaced by 90 electrical degrees, one end of each is connected to slipring 23, the other end of 20 is connected to slipring 22 and the other end of 21 to slipring 24. The frequency converter 10 mounted on shaft 9 comprises a two-phase arrangement of commutator brushes in which 11, 13 are displaced by 180 electrical degrees one from the other and by 90 electrical degrees from 12, 14. The converter sliprings are connected to the mains as in Fig. 1. Brush 11 can be connected to slipring 22 by way of the adjustable secondary of the transformer 15 the primary of which is connected to brush 14 directly and to brush 12 through switch 36. Brush 13 is connected to slipring 23 and can be connected to slipring 24 through the adjustable secondary of the transformer 25 the primary of which is connected to brushes 12, 14 through switch 36. Switch 35 is connected to permit of shortcircuiting winding 20. It is supposed that the secondary winding 20 has more turns and a greater inductance than winding 21, as would be the case for instance if 20 were the ordinary exciting winding of a synchronous motor with distinct polar projections and coiled around said poles while 21 was a winding located in a plurality of slots in the pole shoes of the said poles.

The synchronous motor and the converter of Fig. 3 are the same as in Fig. 2 but the connections from 19 to the converter are somewhat different. Brush 11 can be connected to slipring 22 through the adjustable secondary of the transformer 15 the primary of which is connected to brush 11 and can be connected to brush 12 through switch 36. Brush 13 is connected to slipring 24 and can be connected to slipring 23 through the adjustable secondary of transformer 25 the primary of which is connected to brush 14 and can be connected to brush 12 through switch 36.

The secondary 19 of the synchronous motor of Fig. 4 carries a three-phase star-connected winding 26 connected to the sliprings 22, 23, 24, a two-phase arrangement of commutator brushes 11, 13 and 12, 14 cooperates with the commuted winding 10 of the frequency converter mounted on shaft 9. Brush 11 can be connected to slipring 22 through the adjustable secondary of transformer 15 the primary of which is connected to brush 11 and can be connected to brush 12 through switch 36. Sliprings 23 and 24 are connected to one winding of transformer 25. One end of the other winding of 25 is connected to brush 14 while its other end can be connected to brush 12 through switch 36 and the adjustable secondary of transformer 27 the primary of which is connected to brush 11 and can be connected to brush 12 through switch 36.

In Fig. 5 the synchronous motor is exactly like that of Fig. 4 but the frequency converter mounted on shaft 9, and, of course, connected to the supply through its sliprings, carries a three-phase arrangement of commutator brushes 28, 29, 30 displaced 120 electrical degrees one from the other. Brush 28 is connected to slipring 22. Brush 29 is connected to brush 30 through one winding of transformer 33 and switches 36, 38, a second winding of 33 is connected to one winding of transformer 32, one end of the third winding of 33 is connected to slipring 23 while the other end of this third winding can be connected to slipring 24 through the adjustable secondary of transformer 34. Brush 30 is connected to brush 28 through switch 36 and one winding of transformer 31, a second winding of 31 is connected to one winding of transformer 15 and to one winding of transformer 34, one end of the third winding of 31 is connected to slipring 22 while the other end of this third winding can be connected to slipring 24 through the adjustable secondary of transformer 32. Brush 29 can also be connected to slipring 23 through the adjustable secondary of transformer 15.

Turning to the mode of operation and referring more particularly to Fig. 1, because of the presence of the squirrel cage 6 the machine can be started by closing switch 8. The circuit of winding 20 can be interrupted during the starting period at the resistance 16. If left closed the voltage generated in 20 by the revolving field of the motor will cause currents to flow through the commuted winding 10 of the converter, these currents can be regulated mainly with the help of 16. Switch 18 is preferably left open at starting. After the motor has reached a sufficient speed the converter circuit is closed at 16, if it is open, and switch 18 is closed, thus exciting the converter from the supply. The connections to the converter sliprings are so made that the revolving flux produced in 10 by the line currents revolves in a direction opposed to that in which 10 is driven by 19. Under these conditions the commutator brush voltages are always of slip frequency and of an amplitude independent of their frequency. So soon as 18 is closed a slip frequency voltage $e_1$ appears at the brushes 11, 13 and a voltage $e_2$ at the brushes 12, 13. These voltages are displaced by 45 degrees in phase and both are impressed in series on 20 through 16, $e_1$ is impressed conductively and $e_2$ inductively through transformer 15. The revolving flux produced in the synchronous motor by the magnetizing currents in 5 generates a voltage $e$ in 20. I so adjust the phase of $e_1$ relatively to that of $e$ as to secure the desired exciting-voltage-load characteristic in synchronous operation at which time the converter delivers unidirectional voltages. This desired characteristic is quite likely to be secured when $e_1$ leads $e$ by some 35 degrees as shown in phase diagram Fig. 6. This adjustment can be made by suitably positioning the commutator brushes by means of the handle 7. The frequency converter and the transformer 17 are so dimensioned that $e_1$ will provide the maximum unidirectional current required by 20 in synchronous operation. Transformer 15 is so connected to the brushes 12, 13 and into the circuit of 20 that $e_2$ is vectorially added to $e_1$ to produce a resultant $e_3$ which exceeds $e_1$ in magnitude and leads $e_1$ to a greater or less degree according to the inductance of 20 and to the slip from which synchronization is to proceed. These phase relations are clearly shown in Fig. 6 where the angle $a_1$ is about 35, the angle $a_2$ is 45 and the angle $a_3$ about 65 degrees. The magnitude of the synchronizing torque can be controlled to some extent by the resistance 16 but mainly by the adjustable ratio transformer 15 which permits of changing the magnitude of $e_2$ as impressed on 20 and thereby permits of changing the magnitude and the phase of $e_3$. As synchronization proceeds $e_2$, as impressed on 20, may be reduced by manipulating 15 but whether or not 15 is adjusted $e_2$, as impressed on 20, automatically becomes zero when the motor reaches synchronism for the reason that the converter brush voltage is then unidirectional and as such incapable of being transmitted inductively as by means of the transformer 15. At synchronism $e_1$ is the only voltage impressed on 20 and its magnitude varies with changing load on the synchronous motor in a manner now well understood and because the frequency converter in which $e_1$ is generated is mechanically coupled to the revolving member of the synchronous motor it supplies with exciting current. At synchronous speed there is an unidirectional voltage between the brushes 11, 12 as well as between the brushes 11, 13 with the result that a direct current must flow through the primary of 15. This current must vary with the load on the synchronous motor when 10 is driven by 19; it is a maximum when the resultant flux in the converter stands at right angles to the axis of the brushes 11, 12 and is zero when said flux coincides with the axis named. If it is desired to avoid the loss occasioned by this direct current the circuit of the primary of 15 can be interrupted or a resistance 37 inserted therein by opening switch 36 after synchronization.

Before synchronization the speed of the motor is determined by the load thereon, by the impedance of the squirrel cage and by the effectiveness of the latter. The greater the load the greater the slip and the higher the cage resistance the greater the slip for a given load. A relatively small slip with full load torque can be secured provided the cage resistance is low and its effectiveness high but this means a low starting torque and a small torque per ampere at starting. If the cage characteristics are changed to improve starting conditions then the slip for full load torque is considerably increased. Synchronization with about full load torque can sometimes be secured with high speed machines but not with motors having many poles and synchronization with torque values in excess of the full load torque and approaching the maximum synchronous torque have not heretofore been secured with motors having pronounced polar projections and therefore a field winding of high inductance even when using oversized machines and sacrificing starting conditions entirely in favor of the synchronizing performance. The arrangements here disclosed do not only permit to synchronize pronounced pole and other types of synchronous motors with considerably in excess of full load torque and often with about maximum synchronous torque but they permit of securing this greatly improved synchronizing performance without using oversized machines, without sacrificing starting performance and in machines having any reasonable number of poles, whether pronounced or not. The greater the inductance of 20 and the greater the slip from which synchronization is to take place, in Fig. 1 or the greater the resistance of 6, the greater must $e_2$ be in comparison to $e_1$ and the more must $e_3$ lead $e$ for a given synchronizing performance.

The embodiment of Fig. 2 can be started, for instance by closing 35, moving the contact on the secondary of 25 to shortcircuit 21 and connecting 5 to the mains. The machine can also be started by allowing the starting currents to close through 10 and connecting 10 to the supply for instance after the motor has reached a sufficient speed. The several ways in which machines of this type can be started are now well understood and nothing more need be said about methods of starting in addition to the examples given in connection with Figs. 1 and 2. However started, the synchronizing methods and means which form some of the principal items of the subject matter of this invention are always applicable and given an extremely wide choice in starting methods and means.

In Fig. 2 the secondary of the motor carries a two-phase winding and both phases are used for synchronizing the machine. Phase 20 is supposed to have a higher inductance than phase 21 and to be adapted to furnish the direct current excitation of the motor in synchronous operation. The voltage $e_1$ derived from brushes 11, 13 is conductively impressed on 20, its magnitude is so chosen that it will force through 20 the maximum unidirectional current required by that winding in synchronous operation and the phase of $e_1$ is so adjusted that the magnitude of $e_1$ shall vary in the desired manner as the synchronous load varies. It is usually desired that $e_1$ increase with increasing load. This requires that, at sub-synchronous speeds, the phase of $e_1$ lead the voltage $e$ generated in 20 by some angle $a_1$ usually amounting to from 20 to 40 degrees as shown in Figs. 6 and 7. The phase of the voltage $e_2$ appearing at the brushes 12, 14 differs by 90 degrees from the phase of $e_1$ and is introduced into the circuit comprising 20 by means of the adjustable ratio transformer 15 so as to lead $e_1$ by 90 degrees. The addition of $e_2$ increases the magnitude and changes the phase of the voltage impressed on 20 in the manner shown in Fig. 7. Both phase and magnitude of the resultant $e_3$ can be changed relatively to $e$ by adjusting the secondary of 15. When $e_2$ differs in phase from $e_1$ by 90 degrees as in Fig. 7, instead of by 45 degrees as in Fig. 6, a change in the magnitude of $e_2$ affects the phase of $e_3$ more than its magnitude and vice versa. The voltage $e_2$ is also impressed on 21 by way of 25. If the two brush sets are displaced by 90 electrical degrees, as shown in Fig. 2, then $e_2$ leads the voltage generated in 21 by the same angle as $e_1$ leads $e$.

It is not necessary that the brush sets be displaced by the same angle as the windings on the secondary of the motor with which they cooperate. The result of the arrangement shown in Fig. 2 is firstly to permit the currents due to the voltages generated in 20 and 21 to close through the converter circuits and to produce an induction motor torque in the motor, and secondly to force from the converter conduced and phase displaced currents through 20 and 21 and thereby produce in the motor a synchronizing torque of more or less constant amplitude. If this torque were maintained after synchronism is reached it might cause the machine to run super-synchronously and if $e_3$ is not reduced to the amplitude of $e_1$ when synchronism is reached then the motor will be over-excited in synchronous operation. Both undesirable conditions can be forestalled manually and more or less gradually by changing the transformation ratios of 15 and 25 but if these be not so changed $e_2$ is automatically eliminated from the circuit of 20 as well as from that of 21 by reason of the fact that the source of $e_2$ is linked inductively with each of these windings and that the transformers 15, 25, which form the inductive links, cannot transmit $e_2$ when the latter becomes unidirectional as is the case when synchronism is reached. It is seen that practically any degree of synchronizing performance can be secured in this wise irrespective of the slip of 19 or of the inductance of 20 or 21 and without danger of the machine losing its synchronous character at any load or becoming over-excited or assuming an exciting-voltage-load characteristic other than that desired. Furthermore, the synchronizing ability is automatically resumed to the full whenever the machine steps out of synchronism upon the demand of a torque in excess of the maximum synchronous torque. The phase setting of one auxiliary voltage is quite independent of that of the other and each can be adjusted to the requirements of the secondary winding on which it is to be impressed. The inductance of each winding is an important factor to be considered in this respect. The magnitude of each auxiliary voltage is also independently adjustable and the slip from which synchronization is to take place together with the inductance of the circuit in question are among the principal factors which determine the magnitude setting. If it is desired to avoid ohmic losses in the primaries of 15 and 25 during synchronous operation 36 should be kept open during that time.

In Fig. 3 the fundamental auxiliary voltage $e_1$ derived from the converter brushes 11, 13 is conductively impressed on 20 and 21 connected in series, i. e., on the sliprings 22, 24, and a second phase and magnitude modifying auxiliary voltage $e_2$ displaced by 45 phase degrees from $e_1$ is derived from the brushes 11, 12 and inductively impressed on 20 and 21 by way of transformer 15. A third auxiliary voltage $e_4$ derived from the converter brushes 12, 14 and displaced 90 phase degrees from $e_1$ is inductively impressed on 21 by way of transformer 25. A practically constant synchronizing torque can thus be produced and the machine locked in synchronism and prevented from becoming over-excited by rendering the second and third auxiliary voltages inoperative in so far as 20 and 21 are concerned upon synchronism being reached. To avoid all ohmic losses in the primaries of 15 and 25 during synchronous operation, switch 36 can be kept open during such operation.

In Fig. 4 the fundamental auxiliary voltage $e_1$, that which determines the exciting current in the secondary 19 in synchronous operation, is derived from the brushes 11, 13 and conductively impressed on all three phases of 26, one pole being connected to slipring 22 through 15 and the other to sliprings 23 and 24 through the middle point of the secondary of 25, thus permitting the resulting current to thread 25 through non-inductive paths. A second phase and magnitude modifying auxiliary voltage $e_2$ derived from brushes 11, 12 and displaced 45 phase degrees from $e_1$ is inductively impressed on the same motor circuits by way of transformer 15. A third auxiliary voltage $e_4$ displaced 90 phase degrees from $e_1$ is impressed on but two of the phases of 26 through transformer 25 and the sliprings 23, 24 and in series with the second auxiliary voltage $e_2$ derived from the brushes 11, 12 and impressed on the circuit in question through transformer 27. The three phases of 26 may have the same or different inductances and impedances and this together with the slip from which synchronization is to begin determines the phase and magnitude of the resultant auxiliary voltages impressed on all the phases of 26 and on two of these phases respectively, the component auxiliary voltages combining as for instance in Fig. 6. To avoid all ohmic losses in the primaries the three transformers during synchronous operation switches 36 and 27 can be kept open so long as the speed does not depart from synchronism.

In Fig. 5 the rotor of the motor carries a three-phase winding 26 as in Fig. 4 but the converter is provided with a three-phase arrangement of commutator brushes and a system of three-phase instead of two-phase auxiliary voltages is impressed on 26. The fundamental auxiliary voltage $e_1$ is derived from the brushes 28, 29 and conductively impressed on sliprings 22, 23 in series with a second phase and magnitude modifying auxiliary voltage $e_2$ appearing at the brushes 28, 30, displaced 60 or 120 phase degrees from $e_1$ and introduced into the circuit of the sliprings 22, 23 by means of transformer 15 with the interposition of transformer 31 the primary of which is connected to brushes 28, 30. Similarly the auxiliary voltage $e_2$ does duty as fundamental voltage for the rotor phase controlled by sliprings 22, 24, it is derived from the commutator brushes 28, 30 and impressed on 22, 24 through transformer 31 in series with the auxiliary voltage $e_4$, here acting as phase and magnitude modifying voltage, which is introduced into the circuit of 22, 24 through transformer 32 with the interposition of transformer 33 the primary of which is connected to brushes 29, 30 of the converter. The auxiliary voltage $e_4$ derived from the brushes 29, 30 and displaced 60 or 120 phase degrees from $e_1$ and $e_2$ is impressed on the sliprings 23, 24 through 33 and acts as fundamental auxiliary voltage for this third circuit on 19; it is impressed in series with the here phase and magnitude modifying auxiliary voltage $e_2$ which is introduced into said third rotor circuit by way of transformer 34 with the interposition of transformer 31. The transformers 15, 32 and 34 serve to adapt the auxiliary slip frequency synchronizing voltages to the inductance of the several phases of 26 and to the slip and load from which the motor is to be synchronized without causing the machine to lose its synchronous character and without running the risk of over-exciting same when in synchronous operation. If it is desired to avoid all direct current losses in the transformers 31 and 33 in synchronous operation switches 36 and 38 are kept open, automatically or otherwise, so long as the speed of the motor 5, 19 remains synchronous.

The invention is applicable to motors with and without defined polar projections on the secondary member and regardless of the location and distribution on that secondary of the secondary winding or windings used for synchronization or for producing that additional torque, superposed on the ordinary induction motor torque of the machine, which causes the motor to pull its load into synchronism.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

What I claim is:—

1. The method of synchronizing an alternating current motor having means on its secondary adapted to produce a monoaxial magnetization in inductive relation to its primary, comprising, generating a slip frequency voltage in the said means, impressing on the said means an auxiliary slip frequency voltage having one component of a certain phase relation with respect to that of the generated voltage and having another component displaced as to phase from the first, and rendering one of the components inoperative at synchronism.

2. The method of synchronizing an alternating current motor having means on its secondary adapted to produce a monoaxial magnetization in inductive relation to its primary, comprising, generating a slip frequency voltage in the said means, impressing on the said means an auxiliary slip frequency voltage having one component of an amplitude independent of its frequency but sufficient to insure the maximum unidirectional excitation of the motor in synchronous operation and of a phase with respect to that of the generated voltage to cause the synchronous excitation to increase with increasing load over a range of loads, and having another component displaced as to phase from the first, and rendering the phase displaced component inoperative at synchronism.

3. The method of synchronizing an alternating current motor having means on its secondary adapted to produce a monoaxial magnetization in inductive relation to its primary, comprising, generating a slip frequency voltage in the said means, impressing on the said means an auxiliary slip frequency voltage displaced in phase from the voltage generated in the said means and thereafter diminishing the amplitude of the auxiliary voltage and decreasing the difference in phase between it and the voltage generated in the said means.

4. The method of synchronizing an alternating current motor having windings on its secondary in inductive relation to the primary and adapted to magnetize the secondary along displaced axes per pole pair, comprising, generating phase displaced slip frequency voltages in the windings on the secondary, impressing on one of the secondary windings an auxiliary slip frequency voltage having a certain phase relation to the voltage generated in said winding, impressing on another secondary winding an auxiliary voltage differing in phase from the first auxiliary voltage, reducing the amplitude of the first auxiliary voltage and changing the phase relation between it and the voltage generated in the secondary winding upon which it is impressed, and rendering the second auxiliary voltage inoperative.

5. The method of synchronizing an alternating current motor having windings on its secondary in inductive relation to the primary and adapted to magnetize the secondary along displaced axes per pole pair, comprising, generating phase displaced slip frequency voltages in the windings on the secondary, impressing on one of the secondary windings an auxiliary slip frequency voltage displaced in phase from the voltage generated in said winding, impressing on another secondary winding an auxiliary voltage differing in phase from the first auxiliary voltage, reducing the amplitude of the first auxiliary voltage, and rendering the second auxiliary voltage inoperative.

6. The method of synchronizing an alternating current motor having means on its secondary adapted to produce a monoaxial magnetization in inductive relation to its primary, comprising, inducing in the monoaxial winding a slip frequency current which diminishes with increasing motor speed, conducing into the monoaxial winding a slip frequency current which increases with increasing motor speed and leads the induced current in phase, decreasing the phase difference between the conduced and the induced currents, and as synchronism is reached limiting the conduced current to a value not exceeding about the maximum exciting current required in synchronous operation.

7. The method of synchronizing an alternating current motor having windings on its secondary in inductive relation to the primary and adapted to magnetize the secondary along displaced axes per pole pair, comprising, inducing in the secondary windings phase displaced secondary currents which diminish with increasing motor speed, conducing into one winding on the secondary a slip frequency current which bears a certain phase relation to the induced current in that winding, conducing into another winding on the secondary a slip frequency current which bears a different phase relation to the induced current in that other winding, changing the phase relation of the first conduced current to the corresponding induced current, and reducing the second conduced current to zero.

8. In combination, a synchronous motor having a primary and a secondary, a winding on the secondary in inductive relation to the primary, a winding on the primary adapted to generate a slip frequency voltage in said winding on the secondary, means for producing an auxiliary voltage of slip frequency and of a phase differing from that of the voltage generated in the secondary winding, means for impressing the auxiliary voltage on the secondary winding, and means operated as synchronism is being reached for reducing the phase difference between auxiliary and generated voltages.

9. In combination, a synchronous motor having a primary and a secondary, a winding on the secondary in inductive relation to the primary, a winding on the primary adapted to generate a slip frequency voltage in said winding on the secondary, means for producing an auxiliary voltage of slip frequency, means for impressing the auxiliary voltage on the secondary winding in a certain phase relation to the voltage generated in said winding, and means operated as synchronism is being reached for reducing the magnitude of the auxiliary voltage.

10. In combination, a synchronous motor having a primary and a secondary, a winding on the secondary in inductive relation to the primary, a winding on the primary adapted to generate a slip frequency voltage in said winding on the secondary, means for producing auxiliary phase displaced voltages of slip frequency, means for impressing two phase displaced auxiliary voltages on the secondary winding, and means for rendering one of these voltages ineffective.

11. In combination, a synchronous motor having a primary and a secondary, a winding on the secondary in inductive relation to the primary, a winding on the primary adapted to generate a slip frequency voltage in said winding on the secondary, means for producing auxiliary voltages of slip frequency, means for impressing one auxiliary voltage on the secondary winding conductively, and means for impressing another auxiliary voltage inductively on the circuit comprising said secondary winding.

12. In combination, a synchronous motor having a primary and a secondary, a winding on the secondary in inductive relation to the primary, a winding on the primary adapted to generate a slip frequency voltage in said winding on the secondary, a frequency converter, means for deriving phase displaced auxiliary voltages of slip frequency from said converter, a conductive connection between some of these means and the winding on the secondary, and a transformer linking another of said means to the circuit comprising the winding on the secondary.

13. In combination, a synchronous motor having a primary and a secondary, a winding on the secondary in inductive relation to the primary, a winding on the primary adapted to generate a slip frequency voltage in said winding on the secondary, means for producing phase displaced auxiliary voltages of slip frequency, means for conductively impressing one of these voltages on the winding on the secondary, a transformer included in circuit with said winding, and means for impressing another of the auxiliary voltages on the transformer.

14. In combination, a synchronous motor having a primary and a secondary, a winding on the secondary in inductive relation to the primary, a winding on the primary adapted to generate a slip frequency voltage in said winding on the secondary, means for producing phase displaced auxiliary voltages of slip frequency, one of these voltages having an amplitude independent of its frequency but sufficient to force the maximum desired current through said winding at synchronism, means for conductively impressing this auxiliary voltage on the winding on the secondary, means for impressing another of the auxiliary voltages on said winding, and means for rendering this last voltage ineffective at synchronism.

15. In combination, a synchronous motor having a primary and a secondary, displaced windings on the secondary, a winding on the primary adapted to generate phase displaced slip frequency voltages in said windings, means for producing phase displaced auxiliary voltages of slip frequency, means for impressing two of these voltages on one of the secondary windings, means for rendering one of these voltages ineffective with respect to said secondary winding, means for impressing one auxiliary voltage on another secondary winding and automatic means for rendering the last named voltage ineffective at or near synchronism.

16. In combination, a synchronous motor having a primary and a secondary, displaced windings on the secondary, a winding on the primary adapted to generate phase displaced slip frequency voltages in said windings, means for producing phase displaced auxiliary voltages of slip frequency, means for impressing on each of the secondary windings two auxiliary voltages in series relation, and means for rendering all but one of the auxiliary voltages ineffective at or near synchronism.

17. In combination, a synchronous motor having a primary and a secondary, displaced windings on the secondary organized to produce magnetizations displaced by 90 electrical degrees, means making available two auxiliary phase displaced voltages of slip frequency, connections for impressing one of the auxiliary voltages conductively on at least one of the secondary windings, a transformer included in said connections, means for impressing the second auxiliary voltage on said transformer, a transformer connected across the terminals of at least one winding on the secondary and to the second auxiliary voltage, and means for rendering the second auxiliary voltage ineffective with respect to both transformers.

18. In combination, a synchronous motor having a primary and a secondary, displaced windings on the secondary organized to produce magnetizations displaced by 90 electrical degrees, means making available two auxiliary phase displaced voltages of slip frequency, connections for impressing one of the auxiliary voltages conductively on all of the secondary windings, a transformer included in said connections, means for impressing the second auxiliary voltage on said transformer, a transformer connected to the terminals of at least one of the windings on the secondary and to the second auxiliary voltage, and means for rendering the second auxiliary voltage ineffective with respect to both transformers.

19. In combination, a synchronous motor having a primary and a secondary, a three-phase star-connected winding on the secondary in inductive relation to the primary, means for generating three-phase voltages in said winding, means for producing three phase-displaced auxiliary voltages of slip frequency, a two winding transformer with one winding connected across two terminals of said three-phase star-connected winding, means for connecting one auxiliary voltage to the third terminal of the three phase winding and to the middle point of the transformer winding connected to the two other terminals of said three-phase winding, connections between the second winding of the transformer and a second auxiliary voltage, a transformer connected to include the third auxiliary voltage in series with the first, and a third transformer to include the third auxiliary voltage in series with the second auxiliary voltage.

20. The method of synchronizing an alternating current motor having a winding on its secondary in inductive relation to its primary, comprising, generating a slip frequency voltage in said winding, impressing on said winding an auxiliary slip frequency voltage displaced in phase from the voltage generated in said winding, and thereafter decreasing the phase difference between the auxiliary voltage and the voltage generated in the winding on the secondary.

In testimony whereof I affix my signature this sixth day of January, 1928.

VALÈRE A. FYNN.